United States Patent
Yli-Peltola et al.

(10) Patent No.: US 12,236,304 B2
(45) Date of Patent: Feb. 25, 2025

(54) RFID TAG WITH NARROW GAP FOR USE IN MICROWAVEABLE FOOD PACKAGES

(71) Applicant: DIGITAL TAGS FINLAND OY, Tampere (FI)

(72) Inventors: Ilkka Yli-Peltola, Kangasala (FI); Lauri Huhtasalo, Tampere (FI); Antti Leskelä, Vesilahti (FI)

(73) Assignee: DIGITAL TAGS FINLAND OY, Tampere (FI)

( * ) Notice: Subject to any disclaimer, the term of this patent is extended or adjusted under 35 U.S.C. 154(b) by 0 days.

(21) Appl. No.: 17/770,883

(22) PCT Filed: Oct. 20, 2020

(86) PCT No.: PCT/IB2020/059849
§ 371 (c)(1),
(2) Date: Apr. 21, 2022

(87) PCT Pub. No.: WO2021/079266
PCT Pub. Date: Apr. 29, 2021

(65) Prior Publication Data
US 2022/0405543 A1 Dec. 22, 2022

(30) Foreign Application Priority Data
Oct. 21, 2019 (SE) .................... 1951189-8

(51) Int. Cl.
*G06K 19/077* (2006.01)
(52) U.S. Cl.
CPC ............... *G06K 19/07773* (2013.01)

(58) Field of Classification Search
CPC ....... G06K 19/07773; G06K 19/07786; G06K 19/07749; G06K 19/077; G06K 19/07;
(Continued)

(56) References Cited

U.S. PATENT DOCUMENTS

| 2008/0143480 A1 | 6/2008 | Egbert et al. |
| 2018/0189623 A1 | 7/2018 | Forster et al. |

(Continued)

FOREIGN PATENT DOCUMENTS

| CN | 110399965 A | * 11/2019 |
| JP | 2012-503770 A | 2/2012 |

(Continued)

OTHER PUBLICATIONS

WIPO Application No. PCT/IB2020/059849, PCT International Search Report and Written Opinion of the International Searching Authority mailed Dec. 1, 2020.

(Continued)

*Primary Examiner* — Sonji N Johnson
*Assistant Examiner* — Tae W Kim
(74) *Attorney, Agent, or Firm* — Alston & Bird LLP (57) ABSTRACT

An antenna for an RFID (Radio Frequency Identification) tag comprises two antenna parts being arranged at opposite end areas of the antenna, and at least one intermediate part forming a bridge between the antenna parts. One of the at least one intermediate part comprises power feeding areas to be connected to an integrated circuit. Further, a first gap is arranged in one of the at least one intermediate part, and has a gap length of less than 80 μm, which forms a low impedance path for current at microwave frequencies.

6 Claims, 5 Drawing Sheets

(58) Field of Classification Search
CPC . B65D 2203/10; B65D 81/3446; B65D 81/34
See application file for complete search history.

(56) References Cited

U.S. PATENT DOCUMENTS

| | | |
|---|---|---|
| 2019/0325282 A1 | 10/2019 | Forster et al. |
| 2020/0005110 A1 | 1/2020 | Forster et al. |
| 2020/0006840 A1* | 1/2020 | Forster ............ G06K 19/07779 |
| 2020/0034678 A1 | 1/2020 | Yazaki |

FOREIGN PATENT DOCUMENTS

| | | | |
|---|---|---|---|
| JP | 2017-079340 A | 4/2017 | |
| JP | 2018-163643 A | 10/2018 | |
| WO | WO-2020021767 A1 * | 1/2020 | ......... G06K 19/0723 |

OTHER PUBLICATIONS

Swedish Search Report for Patent Application No. 1951189-8, dated Apr. 29, 2020 (2 pages).
Office Action received for Japanese Patent Application No. 2022-523284, mailed Oct. 8, 2024, (9 pages).

* cited by examiner

RFID TAG WITH NARROW GAP FOR USE IN MICROWAVEABLE FOOD PACKAGES

CROSS-REFERENCE TO RELATED APPLICATIONS

The present application is a national phase entry of International Application No. PCT/IB2020/059849, filed Oct. 20, 2020, which claims priority to Swedish Application No. 1951189-8, filed Oct. 21, 2019, which are each incorporated herein by reference in their entirety.

TECHNICAL FIELD OF THE INVENTION

The present invention is related to an antenna for a radio frequency identification, RFID, tag, and a corresponding RFID tag. The RFID tag is arranged to be useable in a microwave oven, and may for example be arranged on or incorporated in a microwaveable food package or food item. The invention further relates to a packaging for a microwaveable food item comprising such an RFID tag.

BACKGROUND

RFID tags are nowadays used more and more frequently, and for a wide variety of applications, such as in smart labels/tags. The RFID tag is conventionally arranged as a flat configured transponder, e.g. arranged under a conventional print-coded label, and includes a chip and an antenna. The labels/tags are often made of paper, fabric or plastics, and are normally prepared with the RFID inlays laminated between a carrier and a label media, e.g. for use in specially designed printer units. Smart labels offer advantages over conventional barcode labels, such as higher data capacity, possibility to read and/or write outside a direct line of sight, and the ability to read multiple labels or tags at one time.

It is also known to incorporate RFID labels directly in a packaging material, to form so-called intelligent packaging products.

One application for RFID tags which is becoming increasingly interesting is in packages comprising food and the like intended for microwave heating in microwave ovens. The RFID tag can hereby be used e.g. for logistics tracking purposes and the like. However, typically food and the like intended for microwave heating are cooked or heated in the microwave oven without removal of the food container package. The package may even be part of the cooking process.

During the heating or cooking in the microwave oven, the RFID functionality is no longer needed and used, and the RFID tag may be removed prior to placement in the microwave oven. However, removal of the RFID tag may be cumbersome and difficult, and may also easily be forgotten.

Exposure of RFID tags to microwaves in a microwave oven may, however, lead to a concentrated heating, which may lead to safety risks. RFID tags have a gap across which the RFID chip is placed. The power received by the RFID tag from a conventional reader device is generally low, in the order of a few microwatts, whereas a microwave oven may typically operate at a power level in excess of 800 watts, which can generate very high voltages across the gap. Further, RFID antennas are commonly designed to operate at a UHF frequency, for example in the range of approximately 860 MHz to 930 MHz, with the antenna receiving incident power from an RFID reader and converting it to a voltage across the RFID chip to allow it to operate. A microwave oven, on the other hand, typically operates at a higher frequency, typically in the order of approximately 2,450 MHz. When exposed to microwaves in a microwave oven, the microwaves will also be incident on the antenna of the RFID tag. The very high power levels and frequency of these microwaves will generate high voltages on the antenna, and in particular over the gap bridged by the RFID chip, since this gap is necessarily relatively small, typically in the range 100-200 μm. This high voltage may cause a breakdown and generate an arc, and may lead to deformation of the package, sparking and flashing, and the package may even catch fire. This is a safety risk, and may also damage the microwave oven.

US 2018/0189623 proposes a solution to this problem. Here, a shielding layer is provided, and electrically coupled to the antenna across the gap, and overlaying the RFID chip, to limit the voltage across the gap when the antenna is exposed to microwaves from a microwave oven. However, even though this alleviates the above-discussed safety problem, it makes the production of the RFID tag complex, cumbersome and costly.

There is therefore still a need for an improved RFID tag which can be microwaved without safety risks and the other problems discussed in the foregoing.

SUMMARY

It is therefore an object of the present invention to provide an antenna for an RFID tag, as well as a corresponding RFID tag, and a packaging for a microwaveable food item comprising such an RFID tag, which alleviates at least part of the above-discussed problems, and at least partially address one or more of the above-mentioned needs.

This object is obtained by means of an antenna, an RFID tag and a packaging in accordance with the appended claims.

According to a first aspect of the present invention, there is provided an antenna for an RFID (Radio Frequency Identification) tag comprising:
  two antenna parts being arranged at opposite end areas of the antenna;
  at least one intermediate part forming a bridge between said antenna parts, one of said at least one intermediate part comprising power feeding areas to be connected to an integrated circuit; and a first gap arranged in one of said at least one intermediate part, said first gap having a gap length of less than 80 μm.

The present invention is based on the realization that by provision of a very narrow gap, either as the gap between the power feeding areas, i.e. the gap beneath the RFID chip, or in a by-pass path in the vicinity of this, voltage build-up at by microwaves in a microwave oven can be greatly reduced. Due to the extreme closeness of the sides forming this gap, the resulting capacitance is high, which effectively forms a low impedance path for frequencies used in microwave ovens, such as at approximately 2.45 GHz. At the same time, since the frequencies used for operation of the RFID tag, such as frequencies within the UHF band, i.e. approximately in the range of 860-960 MHz, RF current flow at such frequencies are not provided with a low impedance path across the gap, and are not short-circuited, and are still sopped from propagation over the gap. Thus, by using such a very narrow gap, normal operation of the RFID tag at UHF frequencies is not at all affected, and at the same time, the problem of voltage build-up at microwave oven frequencies is greatly alleviated.

Without wanting to be bound by any theory, it is believed that the IC gap and the antenna, and in particular the matching section of the antenna, such as a conductor loop in the middle of the antenna, form an LC resonator circuit. Typical dimensions of UHF antenna including such a matching section and a conventional IC gap have a resonance frequency which is near the microwave band, such as 2.45 GHz. The resonance effect amplifies voltage build-up over the gap and RF currents in the loop. The narrow gap provides a low impedance path for microwave currents and moves the resonance frequency of the circuit to a lower frequency, away from the microwave band. This effectively reduces voltage build-up and current amplitude.

It has been found that by providing a first gap arranged in one of said at least one intermediate part with a gap length of less than 80 µm, the problem of voltage build-up at microwave oven frequencies is greatly reduced. This voltage build-up is even further reduced when an even smaller gap length is provided. Thus, in one embodiment, the gap length is less than 50 µm, and preferably less than 30 µm, and most preferably less than 25 µm. In one embodiment, a gap length of about 20 µm is provided.

It is further preferred that the width of the first gap is relatively great, whereby the voltage build-up over the gap at microwave oven frequencies is even further reduced. In one embodiment, the width of the first gap exceeds the gap length, and preferably is greater than 2 times the gap length, and more preferably is greater than 3 times the gap length, and most preferably is greater than 5 times the gap length. In one embodiment, the width of the first gap exceeds 150 µm, and preferably exceeds 200 µm, and most preferably exceeds 250 µm.

The first gap is preferably arranged to form a low impedance path for electrical waves having a frequency exceeding 2 GHz, such as at frequencies of approximately 2.45 GHz, which corresponds to frequencies conventionally used for microwave ovens.

The antenna may be of many different types, such as a dipole antenna, a monopole antenna, a loop antenna or a slot antenna.

In one embodiment, the antenna may be a dipole antenna, having two dipole antenna parts being arranged at opposite end areas. The two dipole antenna parts arranged at opposite end areas of the antenna may have various shapes and dimensions, as is per se known in the art. For example, the parts may extend in a generally linear direction, or may extend in a non-linear way, such as in a meandering form or the like. The parts may also be folded or curved, thereby extending in two or more directions. In one embodiment, dipole antenna parts may terminate, with end parts, which may have an enlarged width, at least at some positions. The end parts may e.g. have a generally circular or a generally rectangular shape.

The at least one intermediate part form(s) a bridge between the antenna parts. At least one of said at least one intermediate part comprises power feeding areas to be connected to an integrated circuit. The power feeding areas are preferably separated by a gap, which may be the above-discussed narrow first gap, or an additional gap.

The intermediate part is preferably galvanically connected to the antenna parts. However, the connection may also be non-galvanic, whereby coupling may be obtained through electromagnetic field coupling, such as by inductive coupling.

The power feeding areas are arranged to be electrically coupled to an integrated circuit, an RFID chip, which thereby bridges the gap between the power feeding areas. Thus each power feeding area is arranged to transfer current between a connector of the RFID chip and one of the antenna parts.

In one line of embodiments, the narrow first gap is provided between the power feeding areas. Hereby, the narrow first gap serves two purposes: 1) to provide the IC gap to be bridged by the RFID chip, and 2) to reduce voltage build-up at high frequencies. In this line of embodiments, production of the antenna is facilitated, and the antenna hereby becomes more cost-effective to produce.

In another line of embodiments, a second gap is provided between the power feeding areas, and the narrow first gap is arranged in a bypass connection arranged at a distance from the power feeding areas. In such embodiments, the second gap may have a greater gap length than the narrow first gap, such as a gap length in the range of 100-200 µm. However, alternatively, the second gap may also be dimensioned to reduce voltage build-up at high frequencies, in the above-discussed manner.

In this line of embodiments, the antenna becomes somewhat more complex and costly to produce. On the other hand, the placement and attachment of the RFID chip to the antenna may often be simpler in this type of embodiments, which may thereby lower the overall production costs for the RFID tags.

The antenna is preferably configured for operation at the UHF frequency band, such as at one or several frequencies within the range of 860-960 MHz.

According to another aspect of the invention, there is provided an antenna for an RFID (Radio Frequency Identification) tag comprising:

two antenna parts being arranged at opposite end areas of the antenna;

at least one intermediate part forming a bridge between said antenna parts, one of said at least one intermediate part comprising power feeding areas to be connected to an integrated circuit, wherein the feeding areas are separated by an IC gap; and a by-pass gap arranged in a bypass connection arranged at a distance from said power feeding areas, said by-pass gap being arranged to provide a low impedance by-pass path at a microwave frequency.

The by-pass gap may be arranged within the same intermediate part comprising the power feeding areas, or may alternatively be arranged in a separate intermediate part.

The by-pass gap may be arranged to provide a low impedance by-pass path at a microwave frequency in various ways. As one alternative, the gap length may be very short, as discussed in the foregoing, and preferably being less than 80 µm. However, as another alternative, a longer gap length may be used, in conjunction with a very wide gap width, e.g. greatly exceeding the gap length.

In order to obtain a very wide gap width, the gap of the by-pass gap may have a meandering extension. Hereby, a very wide gap width may be obtained within a relatively limited area, such as between two intermediate parts of the antenna.

Such a wide gap may e.g. have a gap width exceeding 10 mm, and preferably exceeding 20 mm, and more preferably exceeding 30 mm, such as exceeding 40 mm, or exceeding 50 mm. In one exemplary embodiment, the gap has a width of about 60 mm. In such an embodiment, the gap length can be much higher than 80 µm, such as within the range of 100-750 µm, and preferably within the range of 200-600 µm, and still provide an efficient low impedance by-pass path at microwave frequencies, such as about 2.45 GHz.

According to another aspect of the invention there is provided an RFID tag comprising the antenna as discussed in the foregoing, an integrated circuit that is connected to the power feeding parts of the antenna, and a dielectric substrate on which the antenna is disposed.

The dielectric substrate can essentially be of any non-conductive material. In one embodiment, the dielectric substrate material is made of at least one of: paper, board, polymer film, textile and non-woven material. In particular, the substrates can be made of paper.

The RFID tags may be either passive, i.e. powered by a reader's electromagnetic field, or active, i.e. powered by an onboard battery.

The antennas may be made of any material, as long as the material is conductive. For example, the antennas may be formed by aluminum, but other metals, such as silver, and alloys may also be used. Forming of the antenna on the substrate can be made in various ways, as is per se known in the art, such as by printing with conductive ink, such as silver ink, by first providing a conductive layer on the substrate and subsequently removing or forming this conductive layer into the desired antenna shape, e.g. by means of grinding, cutting, etching or the like.

According to yet another aspect of the invention there is provided a packaging for a microwaveable food item comprising an enclosure, and the RFID tag as discussed above. The RFID tag may be attached to the enclosure, e.g. by means of adhesive, but may alternatively be formed as an integrated part of the enclosure, in which case the dielectric substrate of the RFID tag may e.g. be formed by the material of the enclosure forming the packaging. Thus, e.g. for production of intelligent packaging products, the antenna of the RFID tag may be provided directly on a package material, e.g. in the form of a sheet or a web.

It will be appreciated that the above-mentioned detailed structures and advantages of the first aspect of the present invention also apply to the further aspects of the present invention.

These and other aspects of the invention will be apparent from and elucidated with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein:

FIGS. 8-13 are field plots from simulations made on antennas in accordance with embodiments of the invention, as well as comparative examples, where FIGS. 8-10 illustrate field plots for comparative examples, having a gap length of 200 µm, and illustrate temperature, surface current and electric field strength, respectively, and where FIGS. 11-13 illustrate field plots for the inventive examples, having a gap length of 20 µm, and also illustrate temperature, surface current and electric field strength, respectively;

DETAILED DESCRIPTION OF PREFERRED EMBODIMENTS

In the following detailed description preferred embodiments of the invention will be described. However, it is to be understood that features of the different embodiments are exchangeable between the embodiments and may be combined in different ways, unless anything else is specifically indicated. It may also be noted that, for the sake of clarity, the dimensions of certain components illustrated in the drawings may differ from the corresponding dimensions in real-life implementations of the invention, such as the thickness of various layers, the relative dimensions of the gap lengths and gap widths, etc. Even though the embodiments discussed in the following comprise dipole antennas, the antennas may also be of other types, such as monopole, loop or slot antennas.

Figure 1:
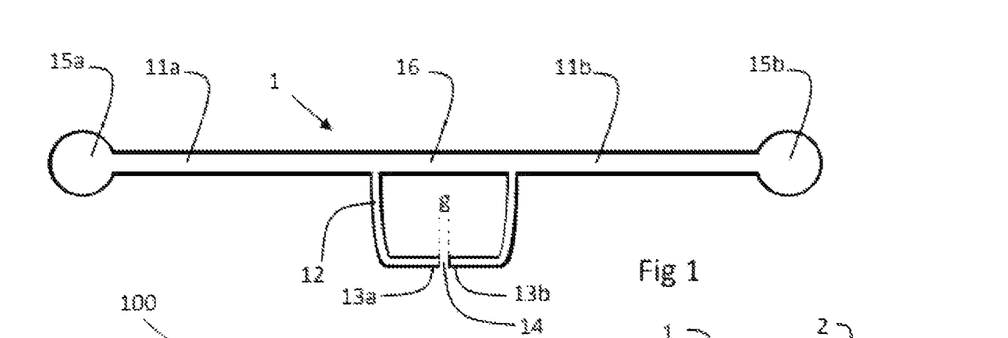
FIG. 1 is a schematic top plan view of an antenna in accordance with a first embodiment.

FIG. 1 illustrates an antenna 1 in accordance with an embodiment of the present invention. The antenna is a dipole antenna arranged to be used in an RFID tag, and is preferably arranged to operate in the UHF band.

The antenna 1 comprises two dipole antenna parts 11a and 11b being arranged at opposite end areas of the antenna. The dipole antenna parts are at one of their ends, the ends being closest to each other, connected to a feed arrangement. Here, the feed arrangement is provided in the form of an intermediate part 12 forming a bridge between the dipole antenna parts, and being provided with two power feeding areas 13a and 13b, separated by a gap 14. The first power feeding area 13a is connected to the first dipole antenna part 11a, whereas the second power feeding area 13b is connected to the second dipole antenna part 11b.

The power feeding areas will, as discussed in more detail in the following, be connected to connectors of an integrated circuit, an RFID chip, which will consequently be arranged overlying and bridging the gap 14.

At the other ends of the dipole antenna parts, not being connected to the power feeding areas, end parts 15a and 15b may be provided. The end parts are preferably provided with smooth, rounded corners, and may e.g. be arranged as generally circular areas. Avoiding of sharp ends prevents voltage build-up.

The two dipole antenna parts 11a and 11b are preferably about equal in size and shape, and are preferably symmetrical with each other.

The dipole antenna parts 11a and 11b are, in the illustrated embodiment, shaped as elongate conductive lines. However, other shapes are also feasible. For example, the part may, at least over a part, extend in a meandering shape. The parts may also have an overall folded or curved shape. Many other shapes are also feasible, as is per se well-known.

Further, the antenna may also be unsymmetrical, and e.g. antenna parts 11a and 11b need not be symmetrical and of equal size and shape.

Further, the end parts 15a and 15b may have the same width as the rest of the dipole antenna parts. However, preferably, the end parts are somewhat enlarged, having at least partly a greater width. The end parts 15a and 15b are in the illustrative example illustrated as being in the form of circles, but other shapes are also feasible, such as rectangular shapes.

In the illustrative example, the dipole antenna parts are further connected through a further intermediate part 16, for impedance matching. However, in other antenna designs, such additional intermediate parts may take other shapes, or may even be omitted.

In order to avoid power build-up over the gap 14 when exposed to microwaves in a microwave oven, which typically have a frequency much greater than the frequencies of the UHF band, such as 2.45 GHz, the gap 14 extends over a very short gap length g. The gap length g is at least less than 80 µm, but is preferably even smaller, such as less than 50 µm, and preferably less than 30 µm, and most preferably less than 25 µm. In one embodiment, a gap length g of about 20 µm is provided.

Due to the very short gap length g, the resulting capacitance is high, which effectively forms a low impedance path for RF current flow at frequencies used in microwave ovens, such as at approximately 2.45 GHz. At the same time, since the frequencies used for operation of the RFID tag, such as frequencies within the UHF band, i.e. approximately in the range of 860-960 MHz, RF current flow at such frequencies are not provided with a low impedance path, and are not short-circuited, and are still stopped from propagation over the gap.

Figure 14:
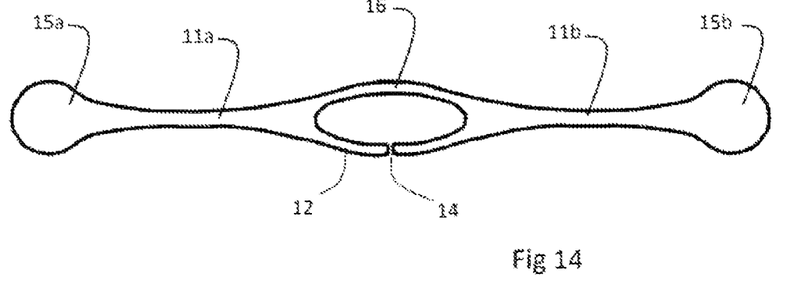
FIG. 14 is a schematic top plan view of another antenna in accordance with an embodiment, which is similar to the antenna design of FIG. 1, but provided with smoother corners and transitions.

It is generally preferred to avoid sharp edges and corners in the antenna, to avoid points of possible power build-up. Thus, the antenna is preferably provided with an overall smooth design, with rounded or beveled corners and transitions between different parts. An example of such a smooth antenna design is shown in FIG. 14. This antenna design is similar to the antenna design of FIG. 1, but where all the corners and transitions have been smoothened.

Figure 2:
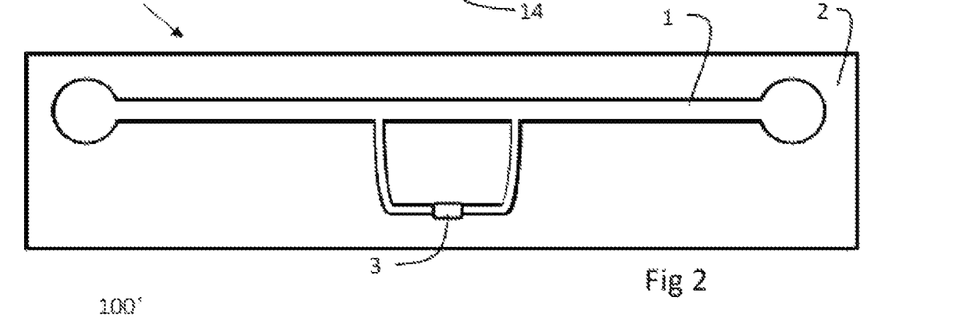
FIG. 2 is a schematic top plan view of an RFID tag using the antenna of FIG. 1.

In FIG. 2, an RFID tag using the antenna of FIG. 1 is illustrated. The RFID tag 100 here comprises the above-discussed antenna 1 arranged on a substrate 2, and an integrated circuit, an RFID chip 3, is arranged on the antenna, and connected to the power feeding areas 13a and 13b, so that the RFID chip bridges the gap 14.

The dielectric substrate can essentially be of any non-conductive material, such as paper, board, polymer film, textile and non-woven material. In particular, the substrates can be made of paper.

The antennas may be made of any material, as long as the material is conductive. For example, the antennas may be formed by aluminum, but other metals, such as silver, and alloys may also be used. For example, it is feasible to use an alloy having a relatively low melting temperature, such as an alloy comprising tin and bismuth. Forming of the antenna on the substrate can be made in various ways, as is per se known in the art, such as by printing with conductive ink, such as silver ink, by first providing a conductive layer on the substrate and subsequently removing or forming this conductive layer into the desired antenna shape, e.g. by means of grinding, cutting, etching or the like.

The narrow gap may be formed by removing conductive material from the gap, e.g. by laser or other detailed cutting technology.

The RFID chip 3 may take any of a number of forms (including those of the type commonly referred to as a "chip" or a "strap" by one of ordinary skill in the art), including any of a number of possible components and being configured to perform any of a number of possible functions. Preferably, the RFID chip includes an integrated circuit for controlling RF communication and other functions of the RFID tag.

In the embodiment discussed in relation to FIGS. 1 and 2, the narrow gap also forms the so-called IC gap, i.e. the gap which is bridged by the RFID chip. Thus, in this embodiment, one and the same gap functions both as an IC gap and as the gap to decrease voltage build-up at high frequencies.

However, it is also feasible to provide the IC gap and the gap to avoid voltage build-up as two separate gaps. Such an embodiment will now be discussed in more detail, in relation to FIG. 3.

Figure 3:
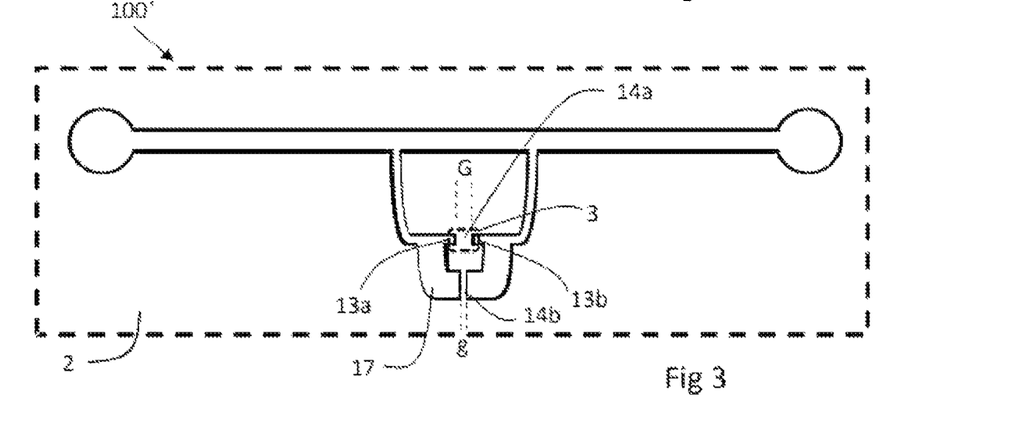
FIG. 3 is a schematic top plan view of an antenna in accordance with a second embodiment, and an RFID tag using this antenna.

In the embodiment of FIG. 3, the intermediate parts are different from the first discussed embodiment. The rest of the antenna, such as the dipole antenna parts, are the same or similar to the first discussed embodiments, and will not be discussed in any further detail. Apart from the specific details discussed in the following, the details and variations discussed in relation to the first embodiment are applicable also for this second embodiment.

In the embodiment of FIG. 3, a bypass path or connection 17 is formed in the vicinity of the IC gap 14a, and the power feeding areas 13a and 13b, and the RFID chip 3 to be connected to the power feeding areas. The bypass path/connection 17 may be formed as a short extension out from the intermediate part 12, or may alternatively be arranged as a separate intermediate part.

The bypass path/connection 17 is provided with a narrow gap 14b, dimensioned to avoid voltage build-up at high frequencies, in the same way as discussed in the foregoing. Thus, this narrow gap 14b in the bypass path/connection 17 has a gap length g which is at least less than 80 µm, but is preferably even smaller, as already discussed. Due to the above-discussed low impedance path obtained over the gap 14b at high frequencies, the bypass path/connection will lead current at high frequencies, such as at conventional microwave oven frequencies, such as at approximately 2.45 GHz, but will prevent transmission of current at lower frequencies, such as at an operation frequency of the antenna in the UHF band.

The gap 14b may be provided centrally in the bypass path/connection 17, as in the illustrative example, but may alternatively be arranged non-centrally, towards one of the sides.

The IC gap 14a arranged between the power feeding areas 13a and 13b may in such an embodiment also be narrow, so that also this gap provides a low impedance path at high frequencies. Thus, the IC gap 14a may also have a gap length g of the same order as the gap 14b in the bypass path/connection 17. However, power build-up at high frequencies is already to a great extent reduced by the bypass path/connection 17, the IC gap 14a may alternatively have a greater gap length G, which may e.g. be of the same dimensions as in conventional RFID tags, such as in the range 100-200 µm.

The antenna of the second embodiment may, as in the first embodiment, be arranged on a substrate 2, illustrated in dashed lines, and with an RFID chip 3, also illustrated in dashed lines, attached to the power feeding areas, to form an RFID tag 100'.

Regardless of whether the narrow gap length g is provided in the IC gap, i.e. between the power feeding areas, or as a separate gap, in a bypass path/connection, it is preferred that the gap width w is relatively long. Preferably, the width w of the narrow gap exceeds the gap length g, i.e. w>g, and preferably is greater than 2 times the gap length, i.e. w>2*g, and more preferably is greater than 3 times the gap length, i.e. w>3*g, and most preferably is greater than 5 times the gap length, i.e. w>5*g. In one embodiment, the width of the first gap exceeds 150 µm, and preferably exceeds 200 µm, and most preferably exceeds 250 µm.

Such a width w may be provided by providing relatively wide conductive pathways in the intermediate parts. At least, as illustrated in FIG. 3, the bypass path/connection 17 may be provided with a relatively great width.

Figure 4:
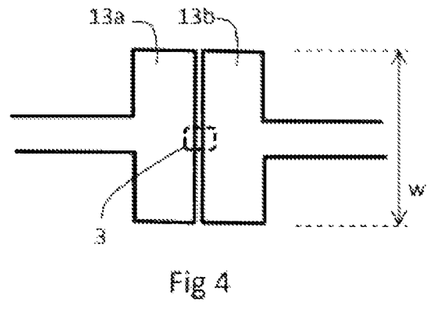
FIG. 4 is a more detailed schematic top plan view of a narrow gap formed in an antenna in accordance with an embodiment.
Figure 5:
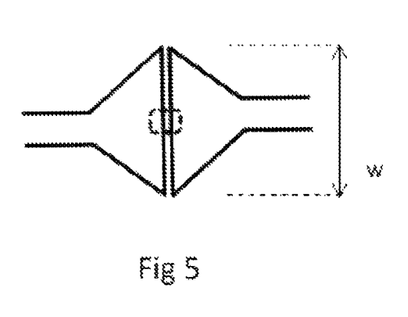
FIG. 5 is a more detailed schematic top plan view of a narrow gap formed in an antenna in accordance with another embodiment.

However, alternatively, it is also feasible to provide the relatively great width only in the vicinity of the gap. Such embodiments are schematically illustrated in FIGS. 4 and 5. FIG. 4 illustrate an example where the relatively wide rectangular areas are formed at the ends forming the gap. In case the gap is provided as an IC gap, the rectangular areas here also function as power feeding areas 13a and 13b, to be connected to the RFID chip 3, as schematically illustrated in dashed lines in FIG. 4. However, similar rectangular areas may also be used even when the narrow gap is provided in a bypass path/connection. However, the enlarged end areas may also assume other shapes, such as having a trapezoidal or semicircular shape. One such alternative, illustrated in FIG. 5, the enlarged end areas are in the form of triangles, with the bases facing each other to form the gap.

Figure 15:
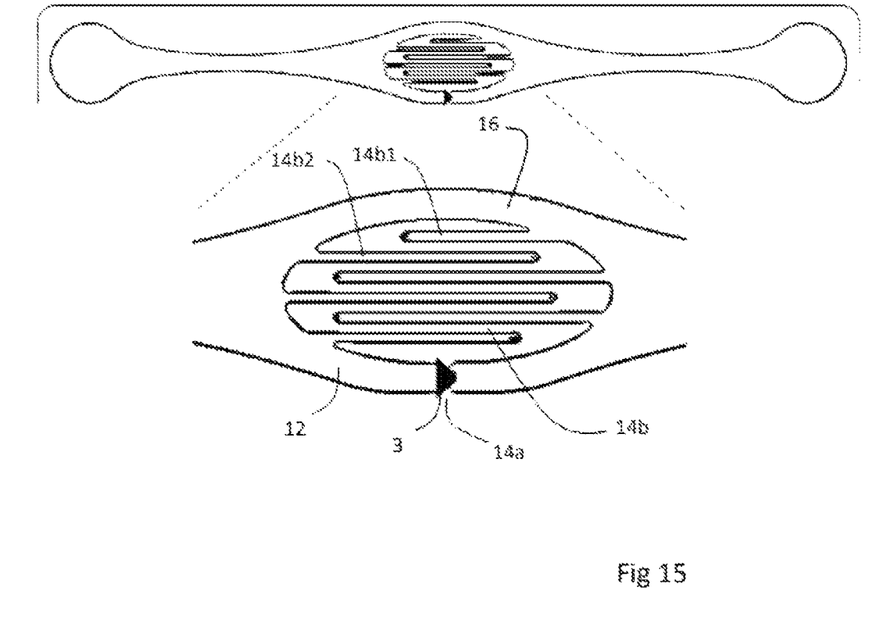
FIG. 15 is a schematic top plan view of another antenna in accordance with yet another embodiment, having a meandering gap.

Another antenna design also providing a low impedance by-pass path for microwave frequencies is illustrated in FIG. 15. Here, and similar to the embodiment discussed in relation to FIG. 3, there is an IC gap 14a between power feeding areas in the intermediate part 12, and an additional by-pass gap 14b arranged in a bypass connection arranged at a distance from the power feeding areas.

The by-pass gap is arranged to provide a low impedance by-pass path at a microwave frequency, such as at 2.45 GHz. However, unlike the previously discussed embodiments, this is not obtained by using a very short gap length. Instead, this effect is here obtained by a longer gap length, in conjunction with a very wide gap width, e.g. greatly exceeding the gap length.

In this embodiment, the very wide gap 14b is arranged in the loop formed between the intermediate parts 12 and 16. However, it may naturally be provided in other places as well.

In order to make the by-pass gap compact, the gap is here arranged in a meandering shape, so that it extends in a meandering extension path. Such a meandering shape may be obtained by providing interleaved arms 14b1 and 14b2, each having a free end, and each having an end connected to the antenna parts, and the connected ends being alternately connected to different sides of the antenna. Depending on the lengths of the arms and the number of arms, the meandering gap formed there between may have a very great width. In the illustrative example, the width may here be about 60 mm. Having a very great width makes it possible to use a somewhat longer gap length, and still obtain the desired effect of a low impedance path being formed over the gap at microwave frequencies. In the illustrative example, the gap length may be about 500 µm. Due to the meandering shape of the gap, the gap becomes very compact, and may still be realized with the same overall dimensions of the antenna.

Figure 6:
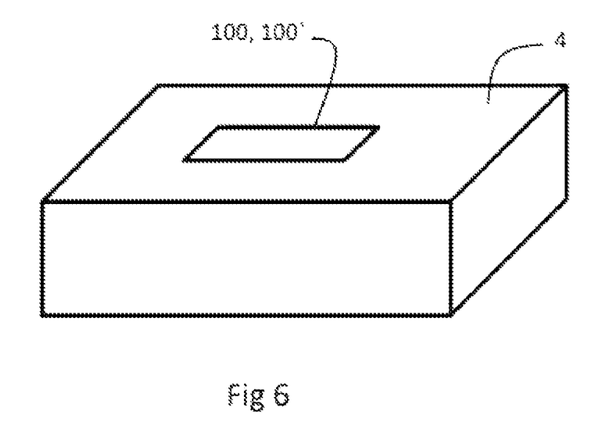
FIG. 6 is a schematic perspective view of a microwaveable food item packaging, including an attached RFID tag in accordance with an embodiment.
Figure 7:
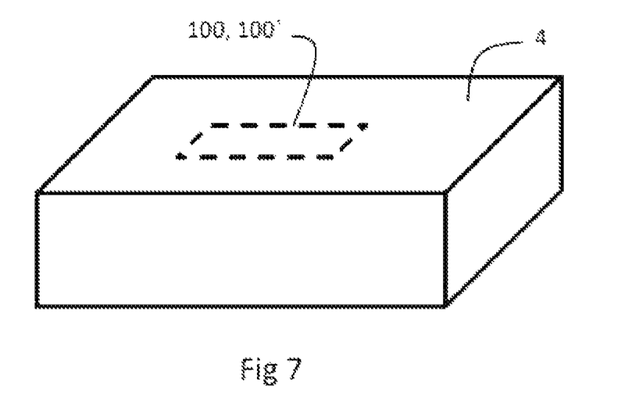
FIG. 7 is a schematic perspective view of a microwaveable food item packaging, including an RFID tag integrated in the packaging material, in accordance with another embodiment.

The meandering gap may seem more complicated to produce than the previously discussed embodiments, but may in fact be produced just as cost-efficiently, or even more cost-efficiently, since even though it comprises more parts, the acceptable tolerances are higher, and the antenna pattern can consequently be produced quicker and with less precision required. The RFID is particularly suited for use in packaging for a microwaveable food. The RFID tag 100 or 100' may hereby be attached to the enclosure forming the package 4, e.g. by means of adhesive, as schematically illustrated in FIG. 6. Alternatively, the RFID tag 100 or 100' may be formed as an integrated part of the enclosure, in which case the dielectric substrate of the RFID tag may e.g. be formed by the material of the enclosure forming the packaging, as schematically illustrated in FIG. 7. Thus, e.g. for production of intelligent packaging products, the antenna of the RFID tag may be provided directly on a package material, e.g. in the form of a sheet or a web.

The enclosure of the packaging may e.g. be in the form of a box of paper or plastic material. Further, while RFID tags are described herein as being incorporated into the packaging of a microwavable food item, it should be understood that RFID tags according to the present disclosure may be useful in any of a number of possible applications, particularly when it is contemplated that they may be exposed to frequencies that are significantly higher than the frequency at which an antenna of the RFID tag is intended to operate.

To evaluate the new concept a number of experimental tests and simulations have been performed.

In a first line of testing, an RFID tag with an antenna made of aluminum and of the general type discussed in relation to FIG. 1, but with an IC gap of 160 µm, was attached to a side made of paper of a conventional microwaveable food item. The food item was exposed to microwaves in a microwave oven of the type Samsung MS23K3523AK, with a moving rotation table. The microwave oven was run at full power, 800 W, for 60 s.

After exposure to the microwaves, it was noted that the paper darkened significantly and became burnt in an area close to the IC gap of the antenna.

The same test was also conducted with an RFID tag in accordance with the invention. For this test, the RFID tag and antenna were identical to the RFID tag and antenna of the first test, but with a reduced gap length at the IC gap. In this second test, the gap length was 20 µm. After the same type of microwave exposure, it was found that no darkening or discoloration appeared on the paper of the package enclosure.

Conceptual tag antenna simulations have also been made. For these simulations, an antenna of the type disclosed in relation to FIG. 1 was used, but with a varying gap length over the IC gap. For the simulations, a gap length of 200 µm was used, as comparative examples, and then a gap length of 20 µm, as inventive examples. In the simulations, an exposure to microwaves of 2.45 GHz was simulated, and with a power and time period corresponding to the radiation in a microwave oven operated at 1000 W for 60 s duration.

Figure 8:
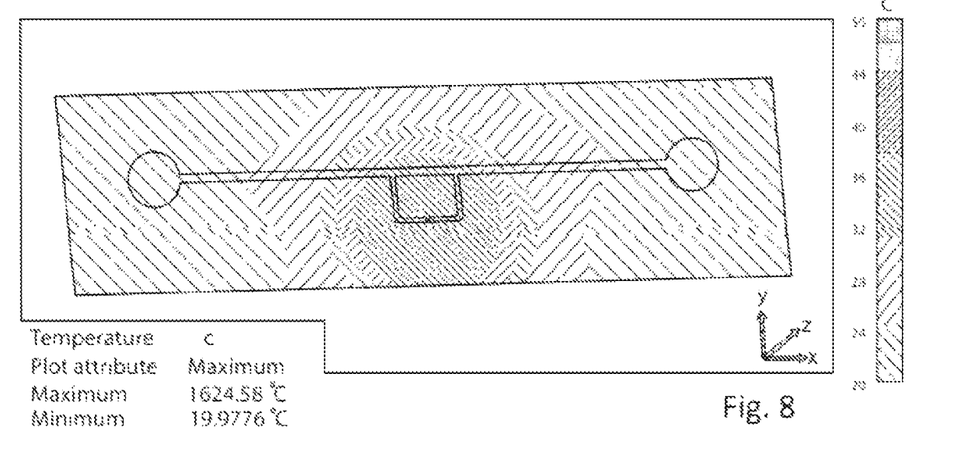
Figure 9:
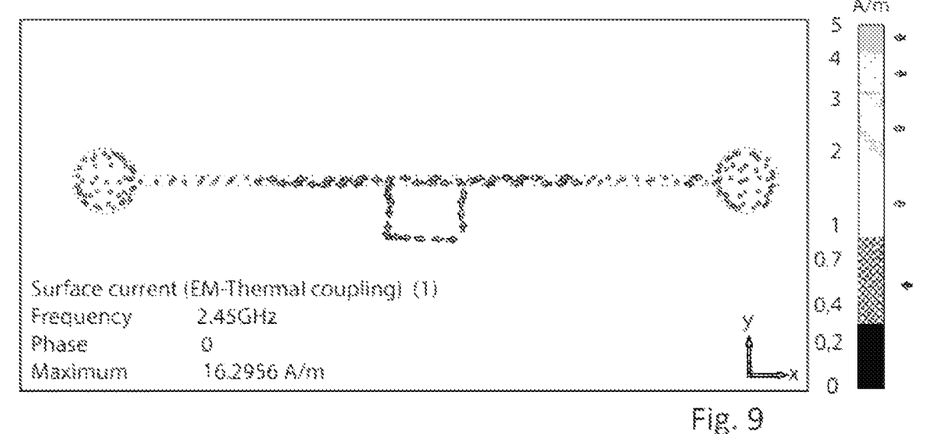
Figure 10:
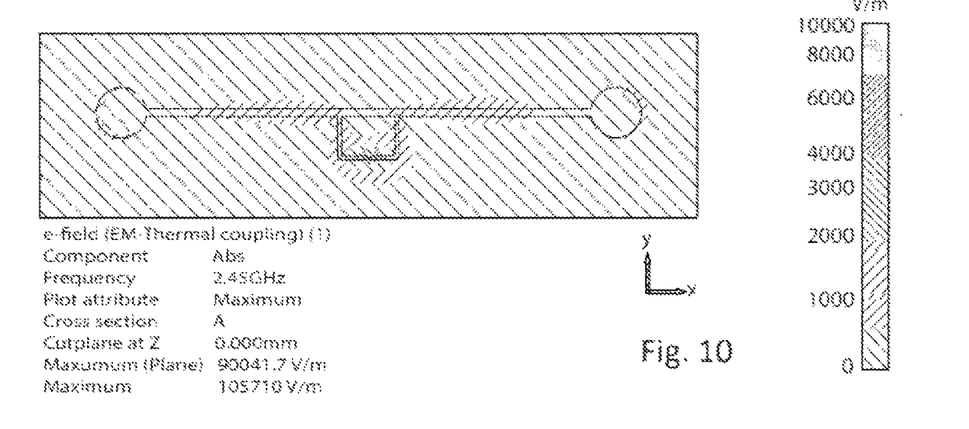
Figure 11:
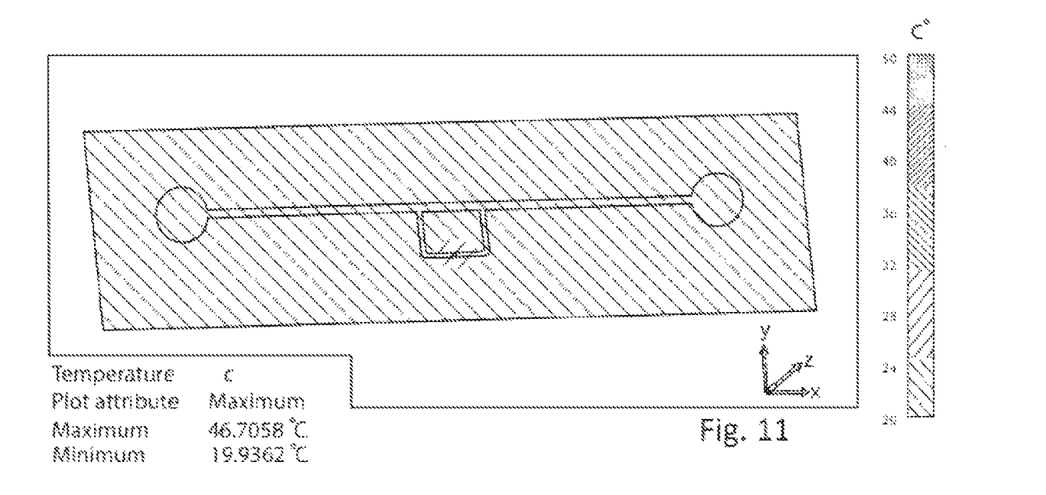
Figure 12:
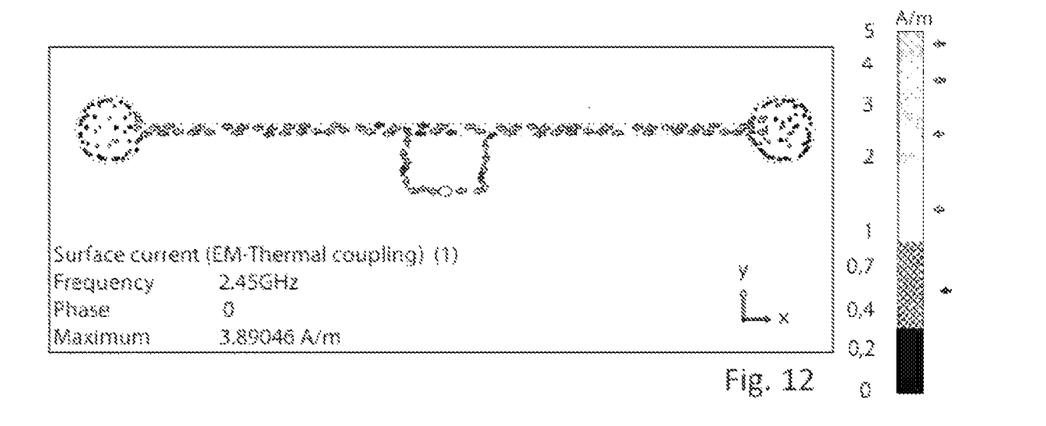
Figure 13:
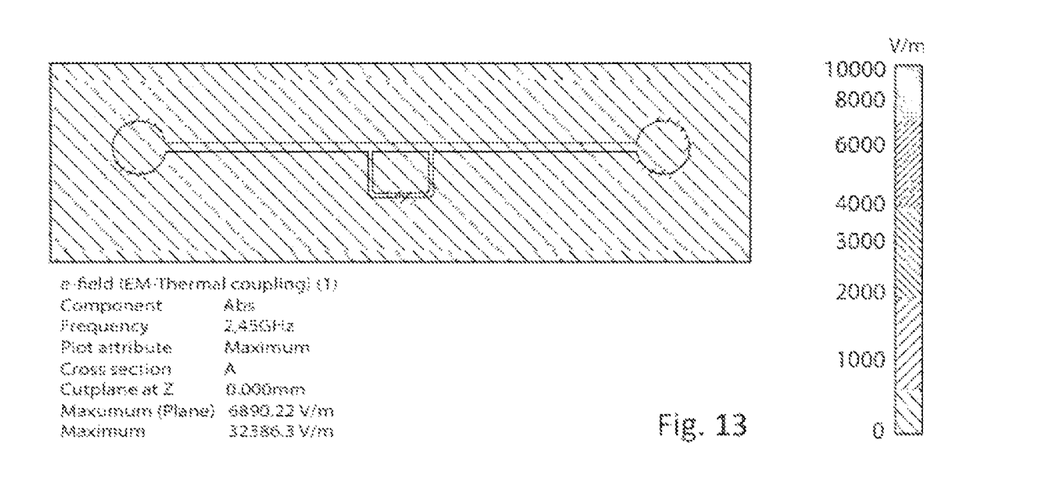

Field plots of these simulations are shown in FIGS. 8-13. FIGS. 8-10 illustrate field plots for the comparative examples, having a gap length of 200 µm, and illustrate temperature, surface current and electric field strength, respectively. FIGS. 11-13 illustrate field plots for the inventive examples, having a gap length of 20 µm, and also illustrate temperature, surface current and electric field strength, respectively.

FIG. 8 illustrate a field plot of the temperature for an antenna with 200 µm gap length (comparative example). It can be seen that an area of very high temperature is present in a wide circle around the IC gap. The maximum temperature, occurring in the center of this circle, i.e. beneath the IC gap, exceeds 1600 deg. C, whereas the minimum temperature, at a distance from the IC gap, is the same as ambient room temperature, about 20 deg. C.

FIG. 9 illustrate a field plot of the surface currents (A/m) over the conductive surface of the same antenna as in FIG. 8, with an IC gap having a length of 200 μm (comparative example). From the field plot it is seen that a very high surface current, exceeding 5 A/m, is present in the entire intermediate part, and with a maximum of 16.3 Nm close to the IC gap.

FIG. 10 illustrate a field plot of the electric field strength (V/m) at the conductive parts of the same antenna as in FIGS. 8 and 9, with an IC gap having a length of 200 μm (comparative example). From this field plot it is noted that a very high electric field strength is present in the vicinity of the IC gap, with a maximum of about 100 kV/m.

FIG. 11 illustrate a field plot of the temperature for an antenna with 20 μm gap length (inventive example). It can be seen that the temperature is low over the entire antenna, and only a very limited temperature increase has occurred in the vicinity of the IC gap. The maximum temperature, occurring close to the IC gap, is below 50 deg. C, only slightly higher than the minimum temperature, at a distance from the IC gap, which is the same as ambient room temperature, about 20 deg. C.

FIG. 12 illustrate a field plot of the surface currents (Nm) over the conductive surface of the same antenna as in FIG. 11, with an IC gap having a length of 20 μm (inventive example). From the field plot it is seen that a very limited surface current, less than 2 A/m, is present in most of the intermediate part, and with a maximum of 3.9 Nm close to the IC gap.

FIG. 13 illustrate a field plot of the electric field strength (V/m) at the conductive parts of the same antenna as in FIGS. 11 and 12, with an IC gap having a length of 20 μm (inventive example). From this field plot it is noted that a very limited electric field strength is present at all places, including in the vicinity of the IC gap, with a maximum of about 3-7 kV/m.

In further simulations, other gap lengths have been analyzed in a similar way. It has been found that the maximum temperature obtained at or in the vicinity of the IC gap is highly dependent on the gap length. The following table shows the maximum temperatures that are obtained for a number of different gap lengths, under the same conditions as in the above-discussed examples illustrated with the field plots.

| Gap length | Max. temperature |
| --- | --- |
| 20 μm | 48 deg. C. |
| 50 μm | 110 deg. C. |
| 100 μm | 1041 deg. C. |
| 200 μm | 1600 deg. C. |
| 500 μm | 191 deg. C. |
| 1 mm | 75 deg. C. |
| 3 mm | 30 deg. C. |
| 6 mm | 23 deg. C. |

From this, a number of observations can be made:

It can e.g. be noted that very high maximum temperatures are obtained within the conventionally used gap length range for the IC gap, i.e. between 100 and 200 μm.

The ignition temperature, i.e. the temperature at which something catches fire and burn on its own, is naturally different for different materials. Ordinary paper has an ignition temperature of about 233 deg. C. However, even though many materials used in packaging for microwaveable food items and the like have a higher ignition temperature, the maximum temperature seen in the gap length range of 100-200 μm is well above the ignition temperature for most conventional packaging materials.

The above-discussed simulations show relative temperature differences when assuming a simple microwave source relatively close to the RFID tag. Naturally, the environment within a real world microwave oven is much more complex, and the absolute temperature levels may to some extent differ from the simulated cases. However, the simulations nonetheless clearly show the dramatic lowering of the temperatures obtained by the provision of the narrow gap.

At very long gap lengths, exceeding at least 500 μm, and preferably exceeding 1 mm, the maximum temperatures are sufficiently low not to provide any safety hazards and the like. However, use of such very long gap lengths is normally not practically feasible.

Below gap lengths of 100 μm, the maximum temperatures decrease dramatically, and is at 50 μm as low as 110 deg. C. This is much below the ignition temperature of all, or at least most, useable packaging materials.

It can be concluded that the gap length where the temperature is sufficiently reduced to adequately prevent voltage build-up and significantly alleviate any safety risks occurs somewhere between 50 μm and 100 μm, and considering the step decent in maximum temperature, it is fair to conclude that this occurs at a gap length of about 80 μm.

The above-discussed gap lengths are optimal for the antenna design used in the simulations. However, for other antenna designs, the optimum gap length may be somewhat different, and could e.g. be below 50 μm, such as 20 μm.

To improve safety even further, the dielectric substrate may be of a non-flammable material. It is also feasible to make the enclosure/package of a non-flammable material, at least in parts adjacent to the RFID tag.

The person skilled in the art realizes that the present invention is not limited to the above-described embodiments. For example, the general antenna design may be varied in many ways, as is per se well-known in the art. The antenna may further be adapted for different operational frequencies. The narrow gap may, as discussed above, be arranged in the IC gap, or in a separate bypass path/connection, and in that case, the bypass path/connection may be provided in numerous different ways.

Such and other obvious modifications must be considered to be within the scope of the present invention, as it is defined by the appended claims. It should be noted that the above-described embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

The invention claimed is:

1. An antenna for an RFID (Radio Frequency Identification) tag comprising:
    two antenna parts being arranged at opposite end areas of the antenna;

at least one intermediate part forming a bridge between said antenna parts, one of said at least one intermediate part comprising power feeding areas to be connected to an integrated circuit, wherein the power feeding areas are separated by a gap to be bridged by the integrated circuit; and a by-pass gap arranged in a bypass connection formed as an extension of the at least one intermediate part, said by-pass gap being arranged to provide a low impedance by-pass path at a microwave frequency, wherein the gap of the by-pass gap has a meandering extension, and wherein the by-pass gap is arranged in a loop formed between a first intermediate part and a second intermediate part.

2. The antenna of claim 1, wherein the gap to be bridged by the integrated circuit has a gap width exceeding 10 mm.

3. An RFID tag comprising:

an antenna according to claim 1;

an integrated circuit that is connected to the power feeding areas of the antenna; and a dielectric substrate (2) on which the antenna is disposed.

4. The RFID tag of claim 3, wherein the dielectric substrate is made of at least one of: paper, board, polymer film, textile and non-woven material.

5. Packaging for a microwaveable food item comprising:

an enclosure; and the RFID tag in accordance with claim 3 secured to the enclosure.

6. An antenna for an RFID (Radio Frequency Identification) tag comprising:

two antenna parts being arranged at opposite end areas of the antenna;

at least one intermediate part forming a bridge between said antenna parts, one of said at least one intermediate part comprising power feeding areas to be connected to an integrated circuit, wherein the power feeding areas are separated by a gap to be bridged by the integrated circuit; and a by-pass gap arranged in a bypass connection formed as an extension of the at least one intermediate part, said by-pass gap being arranged to provide a low impedance by-pass path at a microwave frequency, wherein the gap of the by-pass gap has a meandering extension, and wherein the meandering extension of the by-pass gap is provided by interleaved arms, each of the interleaved arms having a free end, and each of the interleaved arms having an end connected to the antenna parts, wherein the connected ends are alternately connected to different sides of the antenna.

* * * * *